June 20, 1950 J. G. ZIEGLER 2,512,561
METHOD OF AND APPARATUS FOR EXHIBITING AND/OR
CONTROLLING CHANGES IN A CONDITION
Filed Nov. 30, 1945

INVENTOR.
JOHN G. ZIEGLER
BY
D. Clyde Jones
ATTORNEY

Patented June 20, 1950

2,512,561

UNITED STATES PATENT OFFICE 2,512,561

METHOD OF AND APPARATUS FOR EXHIBITING AND/OR CONTROLLING CHANGES IN A CONDITION

John G. Ziegler, Walnut Creek, Calif., assignor to Taylor Instrument Companies, Rochester, N. Y., a corporation of New York Application November 30, 1945, Serial No. 631,869

7 Claims. (Cl. 236—82)

This invention relates to a method of and to apparatus for exhibiting and/or controlling changes in a condition.

In a condition exhibiting and/or controlling device, there is frequently a lag between a change in the condition and the sensing of this change by the device. As a result, the device does not immediately display the true change and does not promptly effect a control action to correct for the undesired change. This lag may be particularly bad where the condition under consideration is temperature. One cause of lag in a temperature exhibiting and/or controlling system is the thermal capacity of the sensing element. Various arrangements have been proposed to overcome this lag, by increasing the rate of heat transfer to the sensing elements, but at best such arrangements have succeeded only in partially reducing the capacity lag.

In accordance with the main feature of the present invention there is provided a method of exhibiting changes in a variable condition in such a manner as to compensate for capacity lags in the sensing or transmission of such changes.

In accordance with another feature of the invention, the method of controlling in which the controlling mechanism can be of the conventional type, which method uses exhibiting changes that are compensated for capacity lags in sensing or transmission as the input to the controller.

In accordance with another feature of the invention, the sensing element can be of the conventional type, but there is introduced between the sensing element and the exhibiting device, means which automatically introduces a corrective factor that compensates for capacity lags in sensing temperature or other condition changes and/or transmission lags of the sensed condition changes.

Figure 2:
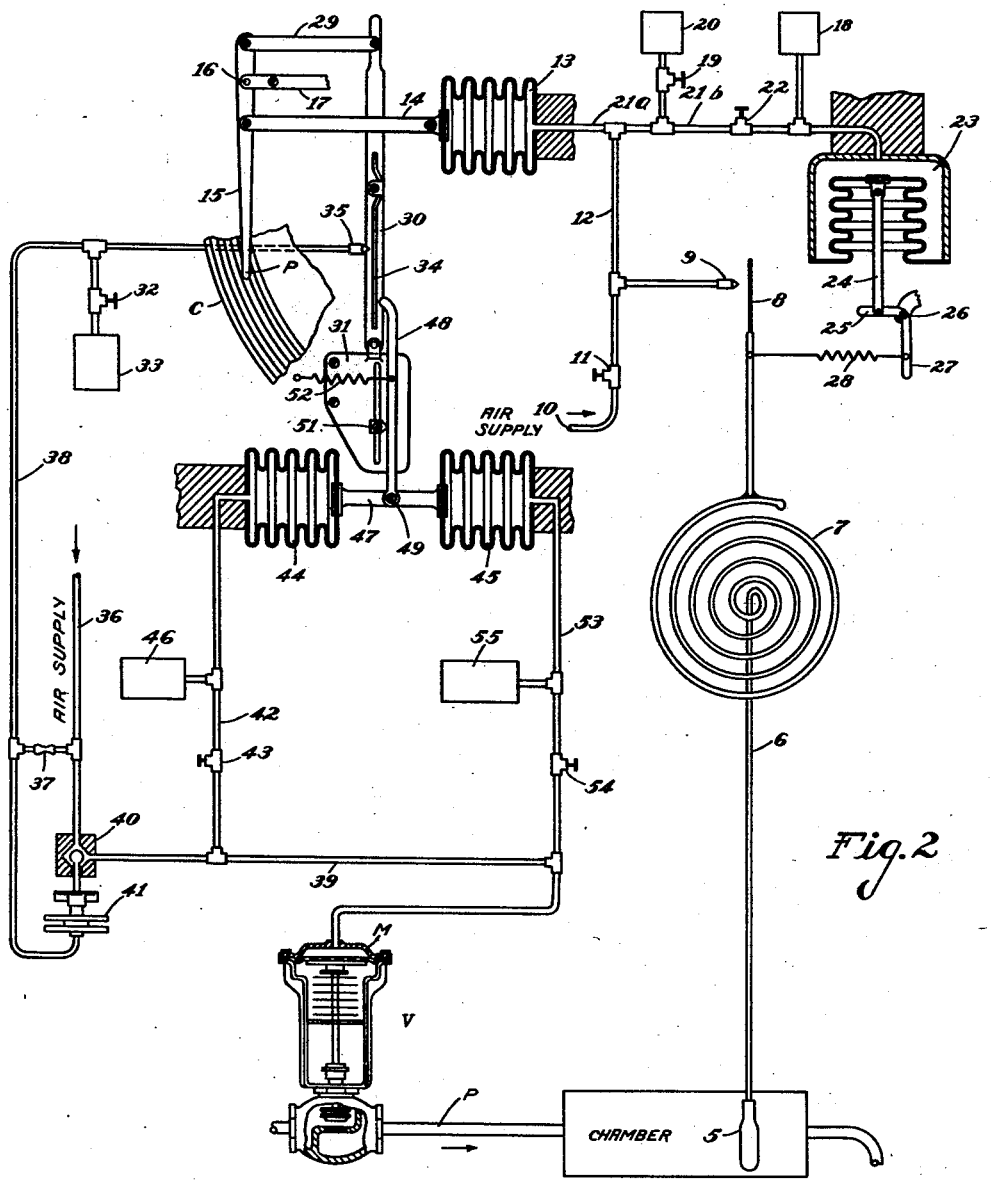
Figure 1:
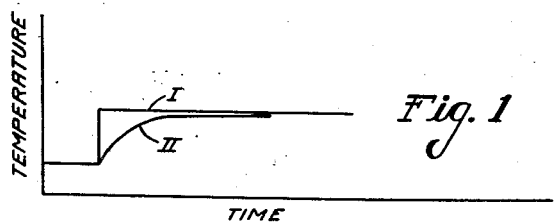

The invention will be understood from the detailed description and the drawing in which Fig. 1 is a chart useful in explaining the invention, and Fig. 2 is a diagrammatic showing of one form of the invention.

In Fig. 2, 5 designates the sensing element or bulb of a temperature measuring device or tube system, which is filled with a thermosensitive fluid. The tube system, in addition to the bulb 5, includes the Bourdon spring 7, which communicates with the bulb through the capillary tube 6. On an increase in temperature within the bulb 5, the Bourdon spring 7 uncoils while on a decrease in temperature, this spring coils up. This coiling and uncoiling of the Bourdon spring may be used for exhibiting temperature changes within the bulb. If the bulb is suddenly immersed in a fluid of temperature higher than that within the bulb 5, the ideal response of Bourdon spring 7 would be shown by curve I (Fig. 1). However, due to the thermal resistance of the bulb-medium interface and the thermal capacity of the bulb 5, the response of Bourdon spring 7 is sluggish, the response being of the character shown by curve II (Fig. 1).

The response of the Bourdon spring 7 lags behind any temperature change of the fluid in which bulb 5 is immersed. When the temperature of the fluid changes, heat flows to or from the bulb. Let Q represent quantity of heat, $\theta$ time, and $t$ temperature. The rate of heat flow $$\frac{dQ}{d\theta}$$

through an element of uniform thickness $dL$ and area A perpendicular to the direction of heat flow across which a temperature difference $dt$ exists, is according to Newton's law:

Equation (1)

$$\frac{dQ}{d\theta} = kA\frac{dt}{dL}$$

$k$ is a proportionality constant known as the coefficient of heat conductivity. If the bulb is in a fluid such as air, the major resistance to heat flow is in the stagnant film of fluid adjacent to the bulb surface. All of the fluid in the chamber is at a uniform temperature because of agitation and the bulb is essentially at a uniform temperature because the conductivity of the metal is very high compared to that of the film. In this case it is conventional to replace $A/dL$ with a film coefficient $h$. Accordingly, Newton's equation becomes:

Equation (2)

$$\frac{dQ}{d\theta} = h(t_L - t_b)$$

when $t_L$ is the temperature of the fluid and $t_b$ is the temperature of the bulb.

Since Q, the heat content of the bulb is proportional to its temperature,

Equation (3)

$$\frac{dQ}{d\theta} = c\frac{dt_b}{d\theta}$$

where $c$ is the thermal capacity of the bulb and

Equation (4)

$$t_L\frac{c}{h} = \frac{dt_b}{d\theta} + t_b$$

The tube system indicates its own bulb temperature and not the temperature of the fluid in which it is immersed. As a consequence, on a change in temperature there is generally an error in the reading of the fluid temperature of $$\frac{c}{h}\frac{dt_b}{d\theta}$$

This error increases as the rate of temperature change increases.

From the foregoing, it will be understood that the temperature of the bulb does not immediately correspond with a change in temperature of the fluid in which it is immersed. Thus, on a change in temperature of the fluid, there is a temporary error in the reading of the fluid temperature, of $$\frac{c}{h}\frac{dtb}{d\theta}$$

as shown by the following equation obtained by transposition of terms in Equation 4.

Equation (5)

$$tl - tb = \frac{c}{h}\frac{dtb}{d\theta}$$

From this equation it will be seen that this temporary error increases as the rate of bulb temperature change increases. In the two Equations 4 and 5 just referred to, the ratio of the thermal capacity $c$ to the film coefficient $h$ is the time lag or delay of the bulb. When the time lag in the bulb is the only lag in sensing the temperature, $t_b$ is the sensed temperature change and the error in the sensed temperature is equal to the time lag or delay of the bulb times the rate of change of the sensed change.

Otherwise expressed in accordance with Equation 4, when the time lag of the bulb is the principal lag in sensing the temperature, substantially the true, prompt indication of temperature of the liquid can be provided by mechanism that indicates the sum of the rate of change of the sensed change times the time lag of the sensing element, plus the sensed change.

Such a mechanism is disclosed in Fig. 2. The free end of the Bourdon spring actuates a baffle 8 in a manner such that the baffle tends to close a nozzle 9 as the Bourdon spring unwinds, and tends to uncover the nozzle as the Bourdon spring winds up. It will be understood that the maximum movement of the baffle with respect to the nozzle is very small, being measured in thousandths of an inch. The nozzle 9 is supplied, through a conduit 10 and constriction 11 therein, with compressed air obtained from a suitable source. The back pressure in the nozzle 9 is applied through conduits 12 and 21a to a pressure responsive unit such as a bellows 13. A link 14 has one end connected to the free end of the bellows 13 and has its other end connected to the pen arm 15 which is pivoted at 16 on a fixed bracket 17. The lower end of the pen arm is provided with a pen or stylus P, which engages a clock-actuated chart C, to make a temperature record thereon. The portion of the device thus far described is of the high sensitivity type in which a small temperature change at the bulb 5 effects a proportionally larger movement of the pen arm.

The conduit 12 also communicates with a branch conduit 21b having a constriction 22 therein and terminating in a bellows 23. A stabilizing capacity 20 may be connected through a resistance or adjustable needle valve 19 at a point in the connection between the conduit 21a and 21b. The capacity 20 and the resistance 19 when connected as shown, prevent instability or hunting the pneumatic system. Capacity 18 is used when a larger delay is required than can be obtained by using only the capacity of bellows 23. The bellows 23 has a fixed end and a movable end, the movable end of the bellows being connected by a link 24 to the arm 25 of a bell crank lever which is pivoted on a fixed pivot 26. The arm 27 of the bell crank lever is connected by a spring 28 to the baffle 8. The constriction 22 is preferably in the form of a needle valve.

With this added construction in the mechanism, if the temperature at the bulb 5 increases, the baffle 8 will tend to approach the nozzle 9. As a result of this approach, the back pressure in the nozzle and in the conduit 12 increases immediately so that bellows 13 expands. The expansion of the bellows moves the pen arm 15 and its stylus P clockwise, to indicate approximately the correct temperature within the bulb 5. However, the increased pressure in the conduit 12 is retarded in its effect on bellows 23 due to the constriction 22 in the branch conduit 21b, so that the expansion of the bellows 23 lags behind the expansion of bellows 13. When bellows 23 expands, it operates through the link 24 to move the bell crank lever counter-clockwise. The resulting movement of the bell crank arm 27 tends to extend the spring 28 until the force component of the spring 28 balances the force component of the Bourdon spring 7. The action of spring 28 tends to move the baffle 8 gradually a small distance away from the nozzle 9. This last-mentioned movement of the baffle is in the opposite direction from that movement of the baffle effected by the Bourdon spring, thereby providing sensitivity reduction. It will be understood that if the constriction 22 were opened wide, the pressure in bellows 23 would immediately be approximately the same as that in conduit 12. Consequently, the bellows 23, acting through the bell crank lever and the spring 28, then would move the baffle 8 in a direction and to an extent which would almost cancel that movement of the baffle which is due directly to the action of the Bourdon spring. This would result in a so-called low sensitivity action in which a relatively large temperature change within the bulb 5 is required to effect even a relatively small movement of the pen arm 15.

By a proper selection of the ratio of bell crank arms 25 and 27 and/or by a proper selection of the force constant of the spring 28, the sensitivity reduction can be controlled at will. The portion of the device thus far described produces a derivative action as a result of which the movement of the pen arm 15 is proportional to the temperature change within the bulb 5, and is also proportional to the rate of temperature change within that bulb. A temperature decrease within the bulb 5 operates the mechanism in the same manner but in the opposite sense. This action may be otherwise expressed by stating that the movement of the pen arm 15 is proportional to the temperature within the bulb 5 and to the derivative of this temperature with respect to time. Consequently, by suitable adjustment of the instrument, the pen 15 will quickly record the temperature of the fluid in which the bulb is immersed.

The remainder of the system diagrammatically illustrated in Fig. 2 shows how the previously described mechanism may be used in conjunction with a controller. The introduction of compensation for a capacity lag, in effect, adds a derivative response to the action of the controller. This will be explained with further reference to Fig. 2. The upper end of the pen arm is connected by a link 29 to the upper end of a baffle supporting arm 30, which is a portion of the controller and which is suitably pivoted on a bracket 31 thereof. The arm 30 has pivotally supported thereon, a baffle 34 in operative relation to a fixed nozzle 35. Compressed air is supplied through the supply conduit 36, the branch conduit and constriction 37, conduit 38, to the nozzle 35. It will be noted that the conduit 38 may have a capacity 33 connected thereto through a resistance or adjustable needle valve 32, to prevent instability in the portion of the pneumatic system in which it is connected.

The compressed air in conduit 38 gradually leaks away through the opening in the nozzle 35, the amount of this leakage being determined by the spacing between the baffle 34 and the nozzle 35. The supply conduit 36 also supplies compressed air to the diaphragm motor top of valve V, through conduit 39 and under the control of the air relay valve 40. The movable part of the relay valve 40 is actuated by a bellows or capsular diaphragm 41 which communicates with the conduit 38, so that as the pressure in this conduit varies, when the spacing between the baffle 34 and the nozzle 35 changes, the diaphragm 41 responds to change the adjustment of the relay valve 40 accordingly. The conduit 39, which communicates with the motor top of valve V, also communicates through the branch conduit 42 and the needle valve or restriction 43 to a bellows 44 of a twin bellows unit. This bellows unit includes two spaced capsular chambers or bellows 44 and 45 having their remote faces mounted on a fixed support and their opposing or movable faces connected together by a bar 47. A lever 48 pivoted at 49 on this bar, engages the adjustable fulcrum 51 being held in engagement by the spring 52. The free end of the lever 48 extends in a position to engage the lower end of the baffle 34. Bellows 45 communicates through branch conduit 53 with the conduit 39 leading to the diaphragm motor of the valve V. It will be noted that the change of the pressure in the bellows 44 in response to a change in the pressure in the conduit 39, is delayed by the needle valve or adjustable restriction 43, as well as by the capacity or reservoir 46. As illustrated, the restriction 43 is connected in series with conduit 42 and the capacity 46 is connected to conduit 42. However, the restriction 43 and the capacity 46 may both be connected in series with conduit 42. It will likewise be noted that the change in pressure in the bellows 45 in response to a change in the pressure in the conduit 39, is delayed by a needle valve or restriction 54 and capacity 55 connected to conduit 53 as shown, or with capacity 55 connected in series with conduit 53. Capacity 55 is generally larger than capacity 46. It will be understood that the capacities 46 and 55 supplement the capacities of the bellows 44 and 45, respectively. Consequently, if the bellows 44 and 45 are made large enough, the mentioned capacities can be omitted.

When the pen arm 15 moves clockwise in response to a temperature increase in the bulb 5, the link 29 moves the baffle support 30 also in a clockwise direction. As a result of this movement of the baffle support, the baffle 34 tends to move away from the nozzle 35. As the baffle 34 moves away from the nozzle 35, the pressure in the conduit 38 is reduced so that bellows 41 contracts to open the valve 40. Thus pressure fluid is supplied through conduit 36, valve 40 and conduit 39 to the motor M of the valve V. This application of the pressure fluid effects an immediate large movement of the valve disc, tending to close the valve thereby reducing the flow of regulating medium through the pipe P to the chamber. As soon as the pressure increases in conduit 39, the pressure medium begins to leak through the constriction 43 into the reservoir 46 and into the bellows 44. This increasing pressure in the bellows 44 causes it to expand so that it tends to move the bar 47 toward the right. Since this movement of the bar moves the pivot 49 and the lower end of the lever 48 toward the right, the upper end of this lever is swung counterclockwise about fulcrum 51 tending to move the baffle 34 toward the nozzle 35. Consequently, the pressure in conduit 38 tends to increase, with the result that bellows 41 expands tending to close the valve 40. This closure of valve 40 reduces the pressure of the medium in conduit 39 and in the motor M of the valve V so that this valve tends to open.

The operation of valve V just described is proportional to the displacement of the pen P from the control point as well as to the derivative with respect to time of the displacement of the pen from the control point. If the pen position were proportional only to the sensed temperature within the bulb, the valve position would be proportional to the sensed temperature as well as proportional to the first derivative with respect to time of this temperature. Since the pen position is proportional to the sensed temperature within the bulb plus the derivative with respect to time of this temperature, the valve position is proportional to this temperature as well as proportional to the first and second derivatives with respect to time of this temperature. From this it is seen that the next higher derivative is introduced into the control action as a consequence of the action of the mechanism interposed between the Bourdon spring 7 and the link 14.

It will be understood that if the constriction 43 and the reservoir 46, as well as bellows 45 with its restriction 54 and reservoir 55 were omitted, the movement of the valve V would be proportional to the movement of the pen arm 15.

While the foregoing operations have been taking place, pressure from conduit 39 leaks through the constriction 54 into the reservoir 55 which is substantially larger than the reservoir 46. Eventually the pressure leaking through constriction 54 will raise the pressure in the bellows 45, which opposes the effect of the pressure in bellows 44 and as the pressure in bellows 45 continues to increase, the bar 47 will be moved toward the left. This causes the lever 48 to swing its upper end in a clockwise direction away from the baffle 34. Thus the space between the baffle 34 and the nozzle 35 is again increased so that the pressure in the conduit 38 is again reduced. Bellows 44 contracts on this reduction in pressure, tending to open the valve 40. These operations continue until the pressures in bellows 44 and in bellows 45 become equal. The opening of this valve 40 again supplies increased pressure through conduit 39 to the motor valve V tending to close it again, the operation of the system being such that the last-mentioned closing of the valve tends to restore the desired temperature within the bulb 5.

The action of the bellows 45 in cooperation with the restriction 54 and reservoir 55, as mentioned above, is to modify the relation between the baffle 34 and nozzle 35 until the pressure in the bellows 45 is equal to the pressure in bellows 44. This condition exists only as long as the desired temperature prevails within the bulb. The operation of the controller mechanism as shown, effects a control action or displacement of the valve V, which is proportional to the displacement of the pen P, which is proportional to the rate of displacement of the pen and which is proportional to the integral with respect to time of the displacement of the pen from the control point.

The description has been made in terms of a pneumatic instrument and a temperature sensing device having a single thermal capacity. The invention is not restricted to temperature applications or sensing devices having single capacities. It applies equally well to any indicator having one or more capacity lags in sensing changes in a variable condition whose indication may, but need not be, the input to a controller. Each additional capacity lag compensated for requires an additional restriction and reservoir interposed into line 21B or its equivalent. It also applies to remote transmitters and valve precisors or positioners. Reference is made to the paper entitled "Optimum Settings for Automatic Controllers" by J. G. Ziegler and N. B. Nichols, presented at the Annual Meeting of The American Society of Mechanical Engineers, in New York, N. Y., December 1–5, 1941.

I claim:

1. In a temperature exhibiting system, a tube system comprising a bulb communicating through a capillary tube with a pressure responsive element, said tube system being filled with a temperature responsive fluid, an exhibiting arm and a scale calibrated in units of temperature with which said arm cooperates to exhibit temperature values, a source of fluid under pressure, means including a pressure actuated device for moving said arm in correspondence with pressure applied to said device, a control couple comprising a baffle and a nozzle relatively movable with respect to each other under the control of said pressure responsive element, means for supplying fluid from said source to said nozzle through a restriction, means for applying a pressure corresponding to the back pressure in said nozzle to said pressure actuated device, a pressure responsive unit also responsive to changes in the back pressure in the nozzle, means for delaying the response of said unit by an interval substantially equal to the time delay in sensing changes in temperature, and means including said pressure responsive unit operating to reduce any mentioned relative displacement of said nozzle and baffle.

2. In a device for exhibiting the value of a condition such as the value of temperature, the value of pressure and the like, mechanism for sensing changes in said condition, an exhibiting arm and a scale calibrated in units of the condition to be exhibited with which said arm cooperates to exhibit the value of the condition to be exhibited, a source of fluid under pressure, means including a pressure actuated device for moving said arm in correspondence with pressure applied to said device, a control couple comprising a baffle and a nozzle relatively movable with respect to each other under the control of said mechanism, means for supplying fluid from said source to said nozzle through a restriction, means for applying a pressure corresponding to the back pressure in said nozzle to said pressure actuated device, a pressure responsive unit also responsive proportionally to changes in the back pressure in the nozzle, means for delaying the response of said unit by an interval substantially equal to the time delay in sensing changes in the condition to be exhibited, and means including said pressure responsive unit operating to reduce any mentioned relative displacement of said nozzle and baffle.

3. In a device for exhibiting the value of a condition such as the value of temperature, the value of pressure and the like, a tube system comprising a bulb communicating through a capillary tube with a pressure responsive element, said tube system being filled with a condition responsive fluid, an exhibiting arm and a scale calibrated in units of the condition to be indicated with which said arm cooperates to exhibit the value of the condition to be indicated, a source of fluid under pressure, means including a pressure actuated device for moving said arm, a control couple comprising a baffle and a nozzle relatively movable with respect to each other under the control of said pressure responsive element, means for supplying fluid from said source to said nozzle through a restriction, means for applying the back pressure in said nozzle to said pressure actuated device, a pressure responsive unit also actuated by changes in the back pressure in the nozzle, means including a restriction and a capacity for preventing instability in the actuation of the exhibiting arm, means including a capacity and restriction for delaying the response of said unit by an interval substantially equal to the time delay in sensing changes in the condition to be exhibited, and means including said pressure responsive unit operating to reduce any mentioned relative movement of said nozzle and baffle.

4. In a condition exhibiting and controlling system, a tube system comprising a bulb communicating through a capillary tube with a pressure responsive element, said tube system being filled with a condition responsive fluid, an exhibiting arm and a scale calibrated in units of the condition to be exhibited with which said arm cooperates to exhibit the value of the condition to be indicated, a source of fluid under pressure, means including a pressure actuated device for moving said arm, a control couple comprising a baffle and a nozzle relatively movable with respect to each other under the control of said pressure responsive element, means for supplying fluid from said source to said nozzle through a restriction, means for applying the back pressure in said nozzle to said pressure actuated device, a pressure responsive unit also responsive to changes in the back pressure in the nozzle, means including a capacity and restriction for delaying the response of said unit by an interval substantially equal to the time delay in sensing changes in the condition to be exhibited, means including said pressure responsive unit operating to reduce any mentioned relative movement of said nozzle and baffle, a control mechanism to correct for changes in said condition, and control means for operating said mechanism as a function of the motion of said exhibiting arm.

5. In a condition exhibiting and controlling system, a tube system comprising a bulb communicating through a capillary tube with a pressure responsive element, said tube system being filled with a condition responsive fluid, an exhibiting arm and a scale calibrated in units of the condition to be indicated with which said arm cooperates to exhibit the value of the condition to be indicated, a source of fluid under pressure, means including a pressure actuated device for moving said arm, a control couple comprising a baffle and a nozzle relatively movable with respect to each other under the control of said pressure responsive element, means for supplying fluid from said source to said nozzle through a restriction, means for applying the back pressure in said nozzle to said pressure actuated device, a pressure responsive unit also responsive to changes in the back pressure in the nozzle, means including a restriction and capacity for delaying the response of said unit by an interval substantially equal to the time delay in sensing changes in the condition to be exhibited, means including a restriction and a capacity for preventing instability in the actuation of the exhibiting arm, means including said pressure responsive unit operating to reduce any mentioned relative displacement of said nozzle and baffle, a control mechanism to correct for changes in said condition, control means for operating said mechanism proportionally to the displacement of said exhibiting arm, and other control means including at least a part of said first control means for operating said mechanism proportionally to the integral with respect to time of the displacement of the exhibiting arm from the control point.

6. In a system for exhibiting the value of temperature of a material, which system is suitable for cooperating with a controller for maintaining the material at different selectable temperatures, a tube system comprising a bulb communicating through a capillary tube with a pressure responsive element, said tube system being filled with a temperature responsive fluid, an exhibiting arm and a scale calibrated in units of temperature with which said arm cooperates to exhibit temperature values, a source of fluid under pressure, means including a pressure actuated device for moving said arm, a control couple comprising a baffle and a nozzle relatively movable with respect to each other under the control of said pressure responsive element, means for supplying fluid from said source to said nozzle through a restriction, means for applying the back pressure in said nozzle to said pressure actuated device, a pressure responsive unit also responsive to changes in the back pressure in the nozzle, means including a capacity and a restriction connection to said unit for delaying the response of said unit to said back pressure which means has a time delay substantially equal to the delay of the tube system in sensing temperature changes of the material, and means including said pressure responsive unit operating to reduce any mentioned relative displacement of said nozzle and baffle.

7. In a system for exhibiting the value of temperature of a material, which system cooperates with a controller for maintaining the material at different selectable temperatures, a tube system comprising a bulb communicating through a capillary tube with a pressure responsive element, said tube system being filled with a temperature responsive fluid, an exhibiting arm and a scale calibrated in units of temperature with which said arm cooperates to exhibit temperature values, a source of fluid under pressure, means including a pressure-actuated device for moving said arm, a control couple comprising a baffle and a nozzle relatively movable with respect to each other under the control of said pressure responsive element, means for supplying fluid from said source to said nozzle through a restriction, means for applying the back pressure in said nozzle to said pressure actuated device, a pressure responsive unit also responsive to changes in the back pressure in the nozzle, means including a capacity and a restriction for delaying the response of said unit to said back pressure by an interval substantially equal to the time delay in sensing changes in the temperature of the material, means including said pressure responsive unit operating to reduce any mentioned relative displacement of said nozzle and baffle, control mechanism to correct for changes in temperature, and control means for operating said mechanism as a function of the motion of said exhibiting arm.

JOHN G. ZIEGLER.

REFERENCES CITED

The following references are of record in the file of this patent:

UNITED STATES PATENTS

| Number | Name | Date |
|---|---|---|
| 1,782,045 | Mason | Nov. 18, 1930 |
| 1,920,827 | Wunsch | Aug. 1, 1933 |
| 1,994,983 | De Florez et al. | Mar. 19, 1935 |
| 2,195,351 | Ziebolz | Mar. 26, 1940 |
| 2,223,712 | Ziebolz | Dec. 3, 1940 |
| 2,242,656 | Moore | May 20, 1941 |
| 2,354,423 | Rosenberger | July 25, 1944 |
| 2,361,885 | Tate | Oct. 31, 1944 |

FOREIGN PATENTS

| Number | Country | Date |
|---|---|---|
| 288,687 | Switzerland | Dec. 16, 1943 |

OTHER REFERENCES

Chemical & Metallurgical Engineering for May 1943, pages 122, 123 and 124.